US008624847B2

(12) United States Patent
Ely (10) Patent No.: US 8,624,847 B2
(45) Date of Patent: Jan. 7, 2014

(54) TRANSDUCER

(75) Inventor: David Thomas Eliot Ely, Cambridge (GB)

(73) Assignee: Synaptics (UK) Limited, Thrapston, Northhamptonshire (GB)

( * ) Notice: Subject to any disclaimer, the term of this patent is extended or adjusted under 35 U.S.C. 154(b) by 1182 days.

(21) Appl. No.: 12/373,428

(22) PCT Filed: Jul. 13, 2007

(86) PCT No.: PCT/GB2007/002648
§ 371 (c)(1),
(2), (4) Date: Aug. 5, 2009

(87) PCT Pub. No.: WO2008/007118
PCT Pub. Date: Jan. 17, 2008

(65) Prior Publication Data
US 2010/0238121 A1    Sep. 23, 2010

(30) Foreign Application Priority Data
Jul. 13, 2006   (GB) .................................. 0613983.6

(51) Int. Cl.
*G06F 3/041*   (2006.01)
(52) U.S. Cl.
USPC ........ 345/173; 345/169; 345/179; 178/18.01; 178/19.01
(58) Field of Classification Search
USPC ............. 345/173, 169, 179; 178/18.01, 19.01
See application file for complete search history.

(56) References Cited

U.S. PATENT DOCUMENTS

| 4,644,102 | A | | 2/1987 | Blesser et al. | |
|---|---|---|---|---|---|
| 5,124,509 | A | * | 6/1992 | Hoendervoogt et al. | .. 178/20.04 |
| 5,149,919 | A | | 9/1992 | Greanias et al. | |
| 5,218,173 | A | * | 6/1993 | Garwin et al. | ............. 178/18.08 |
| 5,231,381 | A | * | 7/1993 | Duwaer | ........................ 345/174 |
| 5,274,198 | A | | 12/1993 | Landmeier | |
| 5,528,002 | A | * | 6/1996 | Katabami | .................. 178/19.06 |

(Continued)

FOREIGN PATENT DOCUMENTS

| GB | 2 032 152 | 4/1980 |
|---|---|---|
| WO | WO 96/18179 | 6/1996 |
| WO | WO 2004/010369 | 1/2004 |
| WO | WO 2004/070396 | 8/2004 |

OTHER PUBLICATIONS

International Search Report for PCT/GB2007/002648, mailed Jul. 4, 2008.

(Continued)

*Primary Examiner* — Bipin Shalwala
*Assistant Examiner* — Afroza Chowdhury
(74) *Attorney, Agent, or Firm* — Nixon & Vanderhye PC (57) ABSTRACT

A transducer for a position sensor includes a single laminate sensor board carrying a plurality of windings formed by conductors on one or more layers of the sensor board. The windings are arrayed over a first area of the sensor board. Detection circuitry is mounted on another layer of the sensor board over a second area of the circuit board and electrically coupled to the windings. The detection circuitry has a first mode of operation in which signals inductively coupled to or from windings are detected and a second mode of operation in which signals capacitively coupled to or from said windings are detected. The windings and detection circuitry are arranged on the sensor board so that said first and second areas oppose each other. A position sensor incorporates the transducer.

23 Claims, 7 Drawing Sheets

(56) References Cited

U.S. PATENT DOCUMENTS

| | | |
|---|---|---|
| 6,417,846 B1 | 7/2002 | Lee |
| 7,084,860 B1 * | 8/2006 | Jaeger et al. ............... 345/173 |
| 7,113,175 B2 * | 9/2006 | Liu et al. .................... 345/173 |
| 7,649,525 B2 * | 1/2010 | Chen et al. .................. 345/173 |
| 7,663,607 B2 * | 2/2010 | Hotelling et al. ............ 345/173 |
| 7,907,130 B2 * | 3/2011 | Ely ............................. 345/179 |
| 2002/0063694 A1 | 5/2002 | Keely et al. |
| 2004/0233178 A1 * | 11/2004 | Silk et al. .................... 345/179 |
| 2005/0171714 A1 * | 8/2005 | Ely et al. ..................... 702/75 |
| 2005/0174259 A1 * | 8/2005 | Ely .............................. 341/5 |
| 2006/0066581 A1 | 3/2006 | Lyon et al. |

OTHER PUBLICATIONS

Written Opinion of the International Searching Authority for PCT/GB2007/002648, mailed Jul. 4, 2008.

\* cited by examiner

TRANSDUCER

This application is the U.S. national phase of International Application No. PCT/GB2007/002648, filed 13 Jul. 2007, which designated the U.S. and claims priority to Great Britain Application No. 0613983.6, filed 13 Jul. 2006, the entire contents of each of which are hereby incorporated by reference.

BACKGROUND

1. Technical Field

The present invention relates to transducers for use in a position sensor and in particular, transducers for use in a dual type position sensor which can sense targets both capacitively and inductively.

2. Related Art

Computer devices are well known and significant research has been made into man machine interfaces that allow humans to interact with the computer devices. For example, capacitive touch pads are well known that allow a user to move a cursor around a screen by moving their finger over the touch pad. Touch screens and digitizers are also well known which can be mounted on or under the surface of the display and which allow the user to make selections directly on the display using either their finger or an electromagnetic stylus.

Recently, a number of proposals have been made to provide a sensor that can sense both the user's finger and an electromagnetic stylus using the same sensing device. Some of these systems effectively employ two separate sensors mounted on top of each other over or under the display. U.S. Pat. No. 5,231,381 is an example of such a system. Others have proposed combining the inductive and capacitive sensing elements by using the same conductors for both capacitive and inductive position measurements. WO2004/070396 describes an example of such a combined sensor which uses the same conductor tracks for both inductive and capacitive measurements.

BRIEF SUMMARY

The present exemplary embodiments aim to provide an alternative design of position sensor which can be used for both capacitive and inductive position sensing.

According to one aspect, the present exemplary embodiments provide a transducer for use in a position sensor, the transducer comprising a sensor board carrying: a plurality of windings formed by conductors on one or more layers of the sensor board, the windings being arrayed over a first area of the sensor board; and detection circuitry mounted on another layer of the sensor board over a second area of the circuit board and electrically coupled to said windings, said detection circuitry having a first mode of operation in which signals inductively transmitted from or received by said windings are detected and a second mode of operation in which signals capacitively transmitted from or received by said windings are detected, and wherein said windings and said detection circuitry are arranged on said sensor board so that said first and second areas oppose each other.

In a preferred embodiment, the sensor board comprises a conductor plane positioned between the plurality of windings and said detection circuitry to reduce noise when said detection circuitry is operating in said second mode of operation. In one embodiment, this conductor plane is formed from a plurality of interconnected conductive islands to reduce eddy current interference when said detection circuitry is operating in said first mode of operation. The islands may be the same shape or different shapes and may be provided in a regular two dimensional array. The conductive plane may be connected to ground or to some other reference signal.

At least one of the windings and preferably all of the windings can comprise conductor traces which form one or more conductive loops for both capacitive and inductive sensing and one or more single ended traces (having one end open circuit) for capacitive sensing only.

In one embodiment, each winding is for sensing position along a measurement path and has a plurality of conductor traces that are distributed along the measurement path and interleaved with conductor traces of adjacent windings.

Preferably the trace width of adjacent traces of the same winding and/or the separation between adjacent traces of the same winding varies along the measurement path. The exact width and/or spacing can be chosen to shape the capacitive coupling profile between the user's finger and each winding.

A divided strike ring formed from a plurality of conductor traces on an upper layer of the sensor board can be provided, which extend around the periphery of the first area and which are electrically connected to the conductor plane. Such a strike ring can help to protect the device from electrostatic discharge while not providing a large loop around the windings in which eddy currents can develop and cause interference for the inductive measurements.

In the preferred embodiments, the detection circuitry uses the same processing electronics to process the signals in said first and second modes of operation, as this reduces costs and circuit design.

The present exemplary embodiments also provide a position sensor comprising a transducer as described above and processing circuitry for processing the detected signals and for determining the position of an object relative to the windings of said transducer.

BRIEF DESCRIPTION OF THE DRAWINGS

A detailed description will now be given of a position sensor embodying the exemplary embodiments, which are described by way of example only, with reference to the accompanying figures in which.

DETAILED DESCRIPTION OF EXEMPLARY EMBODIMENTS

Figure 1:
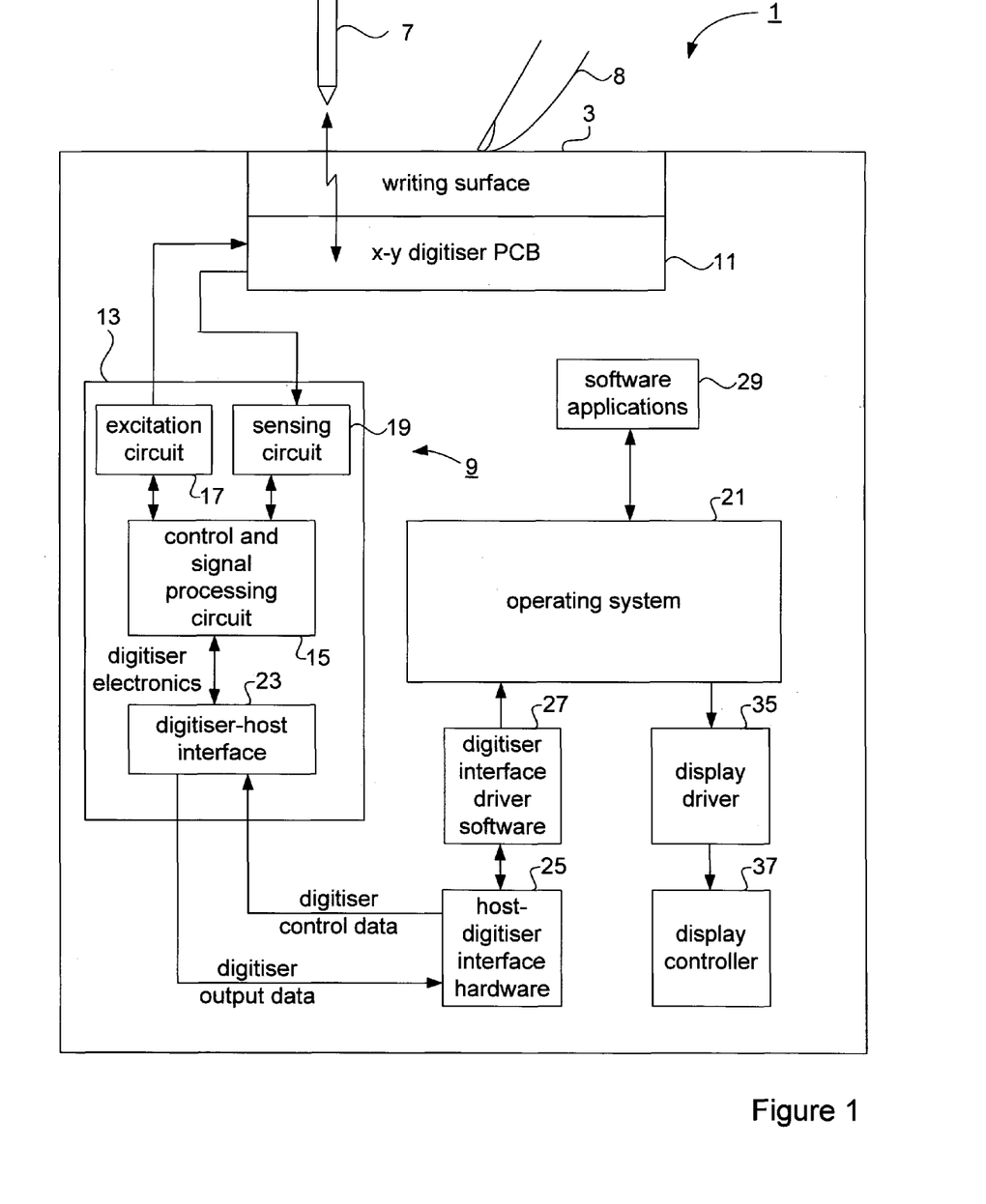
FIG. 1 is a perspective view showing a computer device incorporating a dual capacitive and inductive digitizer (in accordance with an exemplary embodiment) located behind a writing surface (touch pad) which can sense the position of a user's finger or an electromagnetic stylus.

FIG. 1 is a schematic block diagram illustrating a battery-powered computer device 1 such as a notebook PC, personal digital assistant or mobile cellular telephone, which includes a writing surface 3 over which a user can move an electromagnetic (EM) stylus 7 or their finger 8. As shown in FIG. 1, the writing surface 3 is provided over an X-Y digitizer 9 having an X-Y digitizer printed circuit board (PCB) 11 and digitizer electronics 13 (mounted on the lower layer of the PCB 11). The X-Y digitizer 9 is operable to detect the presence and X-Y position of the stylus 7 and/or the user's finger 8 relative to the writing surface 3. The digitizer electronics 13 are connected to conductive windings on the X-Y digitizer PCB 11 and control the excitation of those windings and the sensing and processing of signals generated in the windings by the stylus 7 or the user's finger 8.

More specifically, the digitizer electronics 13 includes a control and signal processing circuit 15 which controls an excitation circuit 17 and a sensing circuit 19. The excitation circuit 17 is used to generate an excitation signal which is applied to a selected one or more of the windings on the digitizer PCB 11. The sensing circuit 19 is arranged to detect the signals generated in some or all of the windings on the digitizer PCB 11 and to pass the detected signals to the control and signal processing circuit 15. The control and signal processing circuit 15 then processes the detected signals to determine the current position (X position, Y position and optionally height (Z) above the writing surface 3), tilt and status of the stylus 7 and/or the current X-Y position of the user's finger 8. The control and signal processing circuit 15 then reports this current position and status information to the host's operating system 21 via a digitizer-host interface 23, host digitizer interface hardware 25 and digitizer interface driver software 27. The operating system 21 then makes this position and status information available to the appropriate software applications 29 running on the host.

As shown in FIG. 1, the operating system 21 also passes digitizer control data back to the digitizer electronics 13 to control, for example, the rate at which the control and signal processing circuit 15 reports the position and status information. The operating system 21 also controls a display driver 35 which, in turn, generates the appropriate control signals for a display controller 37 which controls the image displayed on a display (not shown). In this exemplary embodiment, the operating system 21 controls the display driver 35 in accordance with the current position and/or status information received from the digitizer electronics 13, in order to provide visual feedback to the user via the display.

As will be described in greater detail below, the digitizer system 9 described above includes a novel set of X-Y digitizer windings on the PCB 11 which allows the same windings to be used for both inductive and capacitive sensing. A more detailed description of the X-Y digitizer windings will now be described.

Digitizer PCB

In this exemplary embodiment, the X-Y digitizer PCB is implemented on a conventional four-layer FR4 printed circuit board (PCB). Capacitive sensing electrodes (for finger detection) and inductive sensing coils (for stylus detection) are combined, so that a single winding can serve both purposes.

Figure 2:
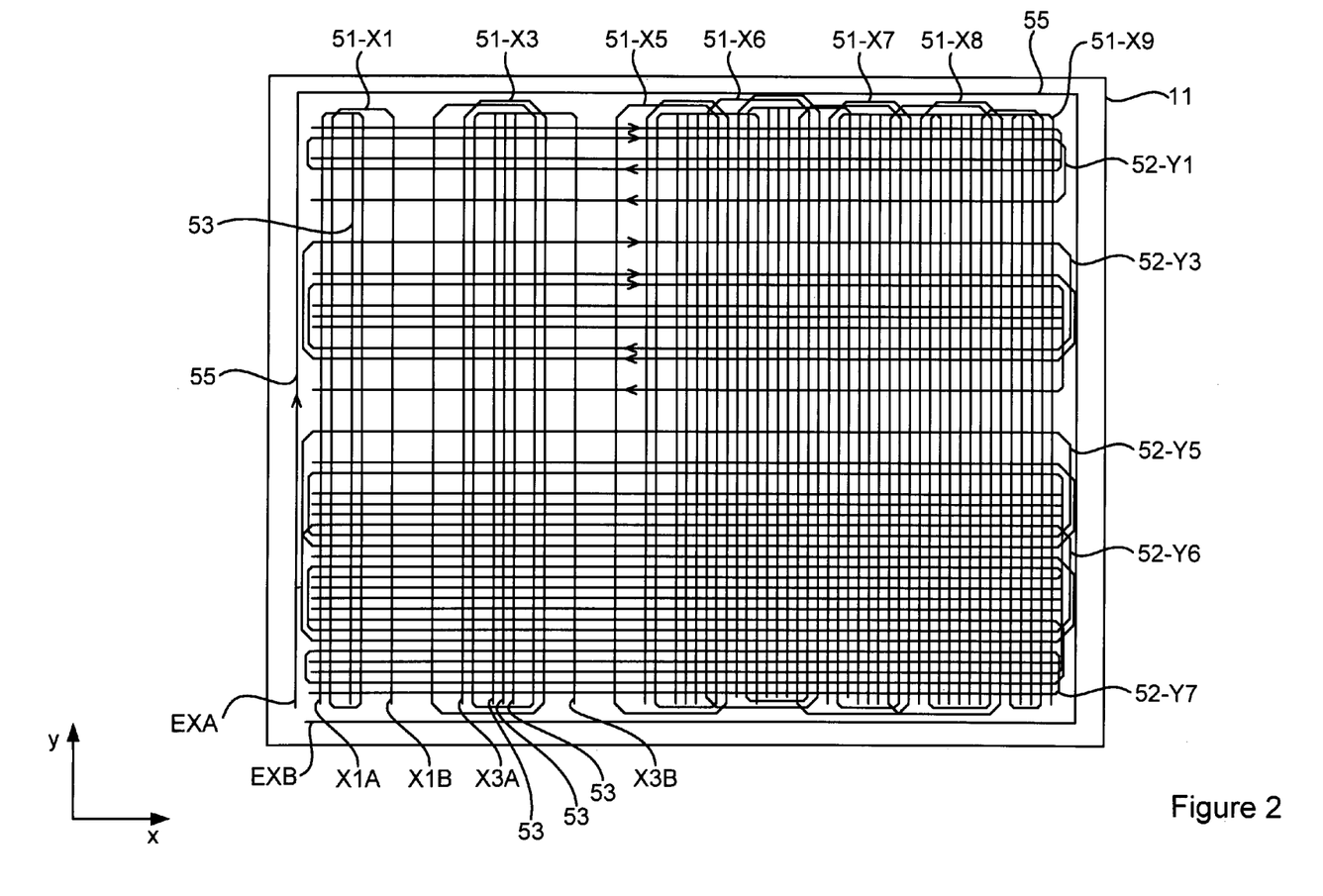
FIG. 2 schematically illustrates the top two layers of a printed circuit board forming part of the exemplary digitizer of FIG. 1 which carries windings used for position sensing, with some windings removed to highlight individual windings.

FIG. 2 shows the windings formed from conductor tracks on the upper two layers (closest to the writing surface 3) of the PCB 11, with some windings removed for clarity. This exemplary embodiment has nine "X" windings 51 (vertically oriented in the Figure) for sensing position along a horizontal axis and seven "Y" windings 52 (horizontally oriented in the Figure), for sensing position along the vertical axis. These windings are numbered 51-X1 . . . 51-X9 and 52-Y1 . . . 52-Y7; although windings 51-X2, 51-X4, 52-Y2, and 52-Y4 have been removed from FIG. 2 to clarify the arrangement of windings 51-X1 and 51-X3 and 52-Y1 and 52-Y3. FIG. 2 also shows an excitation winding 55 that is used to energize the EM stylus 7, the ends of which (labelled EXA and EXB) are connected to the excitation circuit 17 which is mounted on the bottom layer (furthest from the writing surface 3) of the PCB 11.

As shown in FIG. 2, each of the X and Y windings 51, 52 consists of one or more substantially rectangular loops together with some "single ended" conducting traces (some of which are labelled 53) connected thereto. The two ends of each winding (for example ends X1A and X1B, X3A and X3B) are connected to the excitation and sensing circuits 17, 19. For inductive sensing, EMFs (electromotive forces) generated in the loops of each winding 51, 52 are measured by the sensing circuit 19. For inductive sensing, the single ended traces 53 connected to the loops have no effect as they do not form part of a loop and so no EMF is generated in them. For capacitive sensing, each winding effectively acts like an electrode and the two ends of each winding are held by the excitation circuit 17 at substantially the same potential. For capacitive sensing, the single ended traces are also held at the potential and play an active role in the capacitive sensing measurements. The control and signal processing circuit 15 then monitors the net flow of charge onto and off the winding. By monitoring the signals obtained from all of the nine X windings 51 and all of the seven Y windings 52, the control and signal processing circuit 15 can determine the position of the EM stylus 7 and/or the position of the user's finger 8 over the writing surface 3.

In the following description the term "winding" will be used to refer to one of the X or Y windings 51, 52 whose ends are connected to the excitation and sensing circuits 17, 19. The term "coil" will be used to refer to the inductive portion comprising the multiple "loops" of the winding; and the term "trace" will be used to refer to any portion of a winding 51, the exact portion being made clear in the context.

Figure 3A:
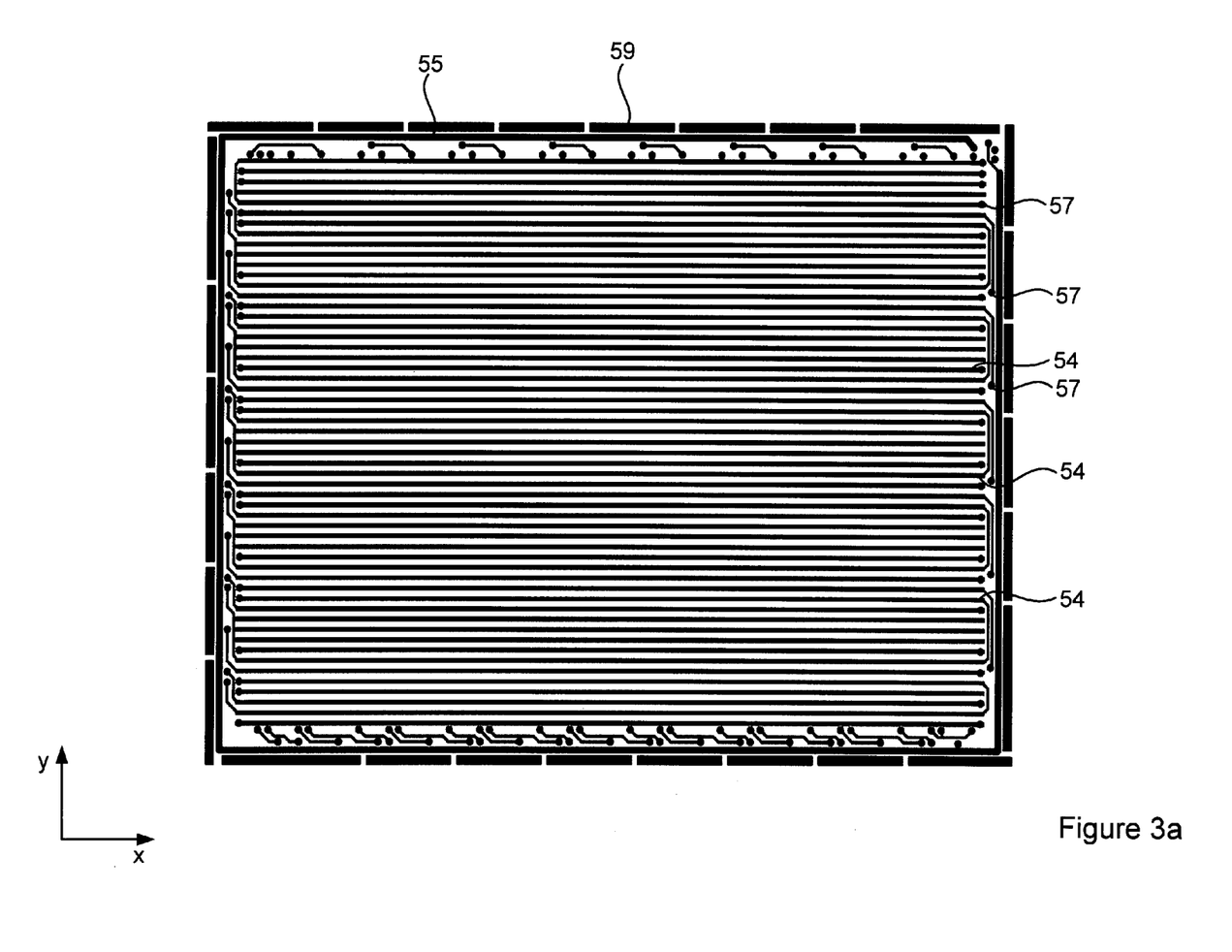
FIG. 3a illustrates the conductor tracks which are formed on a top or first layer of the printed circuit board of the exemplary digitizer of FIG. 1.
Figure 3B:
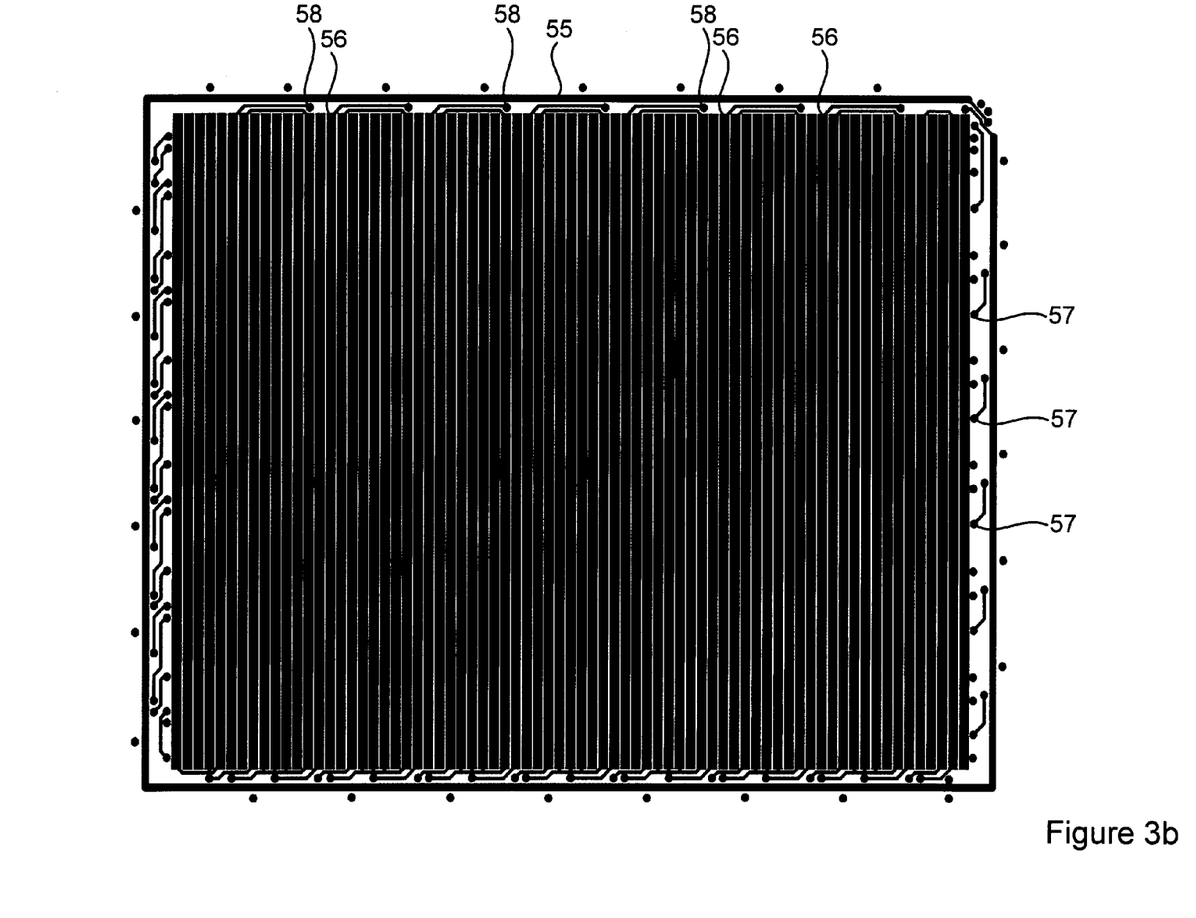
FIG. 3b illustrates the conductor tracks which are formed on a second layer of the printed circuit board forming part of the exemplary digitizer of FIG. 1.

Although FIG. 2 illustrates the conductor traces on the two upper layers together and represents each winding trace as a thin line, the traces would in practice have non-zero width, and this width neither need nor should be very narrow; and the apparent intersections between traces in most cases corresponds to traces passing over and under one another on separate layers without connection. FIGS. 3a and 3b illustrate how this is accomplished in this embodiment. In particular, FIG. 3a shows the top copper layer of the PCB 11, which in this case carries most of the conductor traces (some of which are labelled 54) that form the Y windings 52; and FIG. 3b illustrates the second layer underneath the top layer, which in this case carries most of the conductor traces 56 that form the X windings 51. As shown, the traces 54 that form the Y windings 52 extend across the sensor board 11 along the X direction and connect to traces on the second layer (shown in FIG. 3b) at the via holes, some of which are labelled 57, located towards the side edge of the PCB 11. Similarly, the traces 56 that form the X windings 51 extend across the sensor board 11 along the Y direction and connect to traces on the first layer (shown in FIG. 3a) at the via holes, some of which are labelled 58, located towards the top edge of the PCB 11.

As can be seen from FIGS. 3a and 3b, the traces on the second layer are wider than those on the top layer. This is to compensate for the traces on the second layer being further away from the writing surface 3 than the traces on the top layer and (more importantly) to compensate for the shielding effect of the conductors on the top layer. The result is that the capacitive coupling from the finger to the conductors on the top two PCB layers is approximately equal.

Figure 3C:
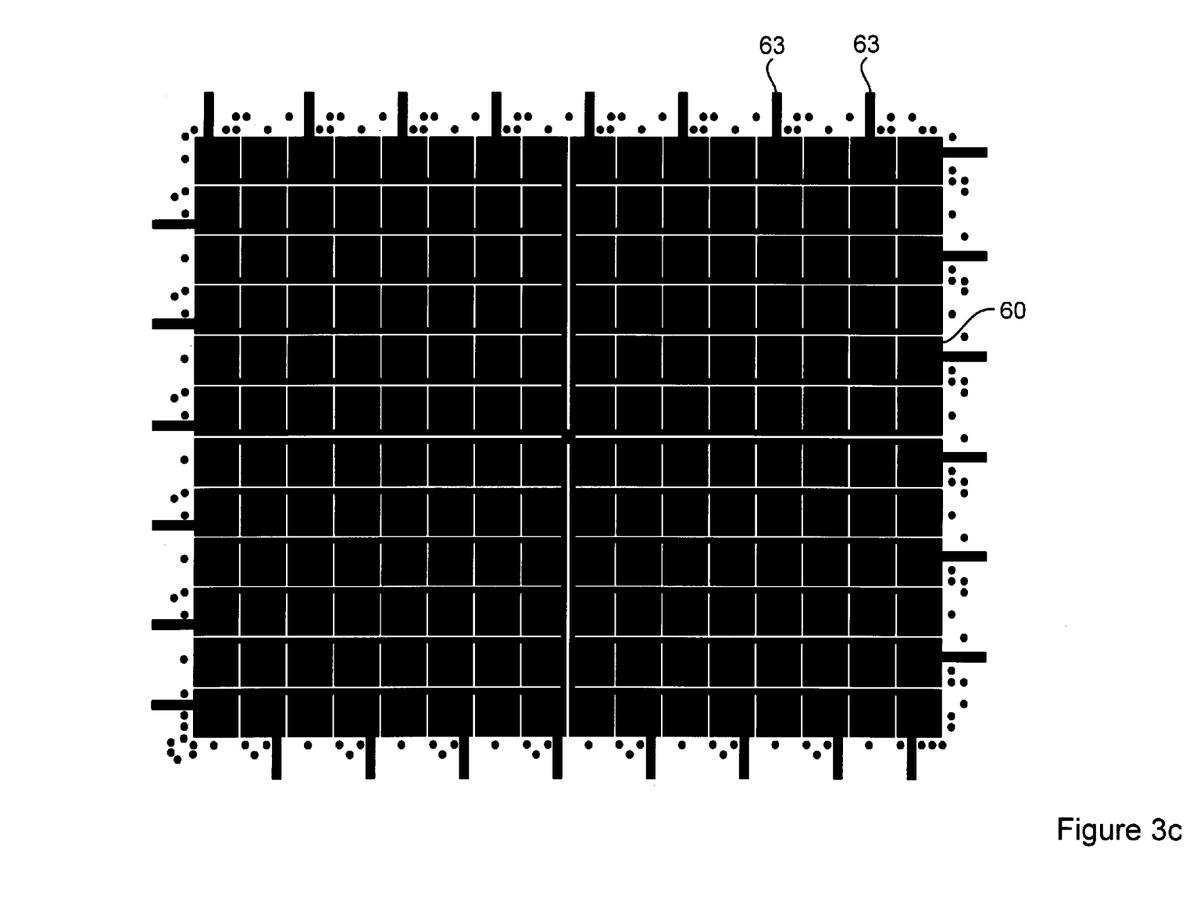
FIG. 3c illustrates the conductor tracks on a third layer of a printed circuit board which forms a divided ground plane of the exemplary digitizer of FIG. 1.

The third layer of the PCB 11, which is shown in FIG. 3c, comprises a ground plane 60, which helps to shield the capacitive operation of the sensor from large metallic objects under the PCB 11, such as an integrated circuit, a speaker, part of the chassis of the computer device, etc. However, the inventor found that a solid ground plane under the windings 51, 52 introduced significant interference for the inductive operation of the digitizer 9. As this inductive interference is caused by eddy currents flowing in the ground plane, the inventor divided the ground plane into small islands or tiles (in this case square tiles) that are all connected together and to ground. As a result, eddy currents can only build up within each tile and, as the area of each tile is small relative to the area of the PCB 11, this reduces the degradation of the inductive operation and reduces the power consumption of the digitizer 9.

Figure 3D:
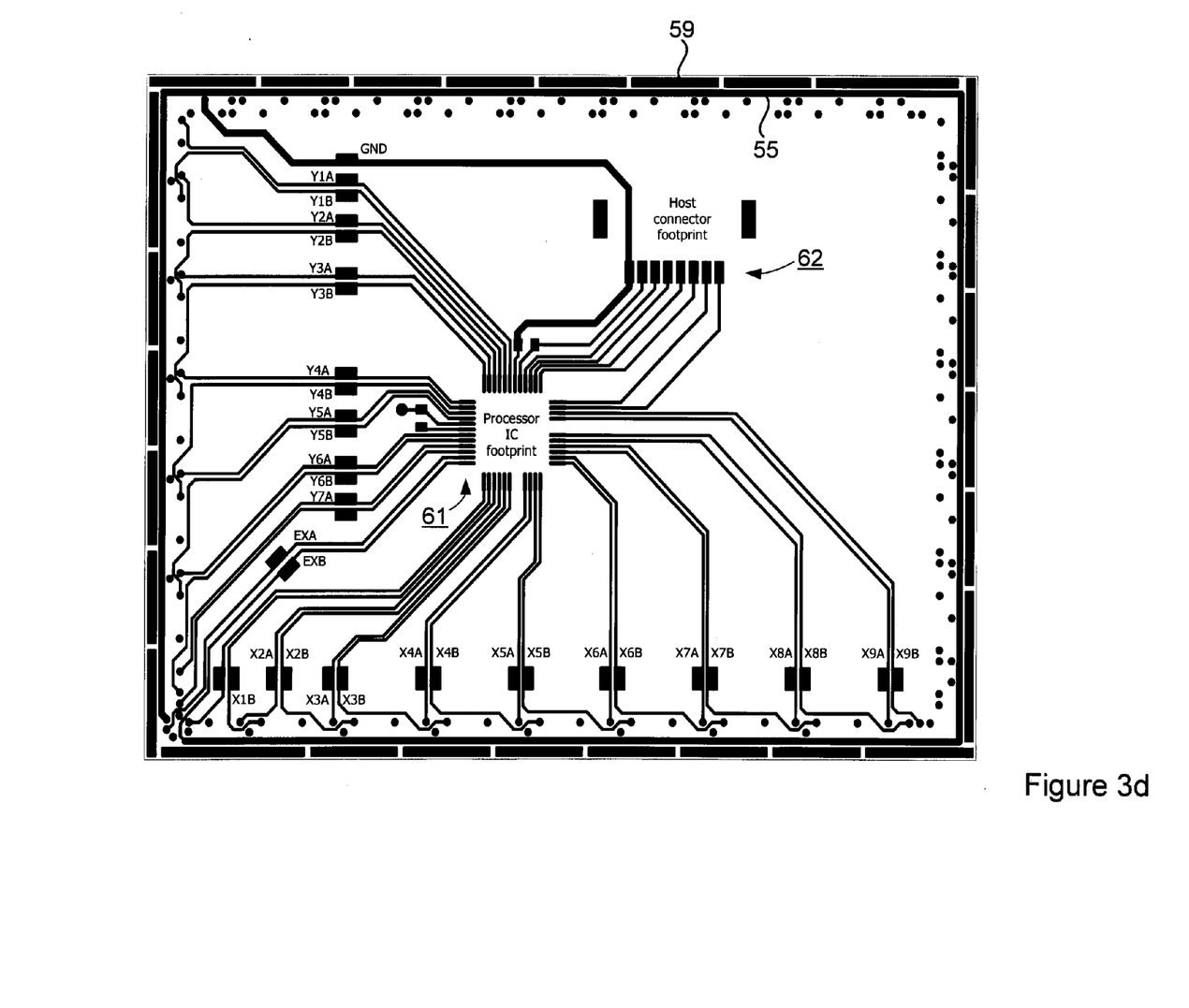
FIG. 3d illustrates a fourth or bottom layer of the printed circuit board forming part of the exemplary digitizer of FIG. 1 illustrating the way in which the conductor tracks on the other layers are connected together and to excitation and processing circuitry.

The bottom layer of the PCB 11, which is shown in FIG. 3d, comprises connection pads 61 for receiving an ASIC that has the digitizer electronics 13 and a connector 62 for connecting the digitizer electronics 13 to the host's electronics. FIG. 3d also shows that the ends of the various windings 51, 52 are connected to appropriate input/output pins of the ASIC.

In this exemplary embodiment, the upper and lower layers of the PCB 11 also carry a strike ring 59 which provides the digitizer electronics 13 with some protection from electrostatic discharge. As shown, the strike ring 59 surrounds the main windings of the PCB and is divided into a number of strips, each of which is connected to the ground plane 60 by the connectors 63 (shown in FIG. 3c) and vias which extend through the PCB 11 from the top layer to the bottom layer through the connectors 63. Dividing the strike ring 59 in this way again reduces interference caused by eddy currents circulating around the strike ring 59.

Capacitive Operation

To detect the position of the user's finger 8 (or other object having an impedance to ground that is small in comparison to its capacitive coupling to the X and Y windings 51, 52), the excitation circuit 17 drives all of the X and Y windings 51, 52 with an AC voltage and the sensing circuit 19 measures the current required to drive each one. The excitation circuit 17 may drive either the A or B end of each winding 51, 52, or both ends together. Driving both ends together is preferable in embodiments where the windings have appreciable resistance. The AC drive voltage used may not be a simple sinusoid; it may be preferable, for instance, to drive the windings 51, 52 with a signal having substantial high or low frequency components such as a step function or a pulse. All the X and Y windings 51, 52 are preferably driven together to avoid influence caused by capacitive coupling between the X and Y windings. The set of current measurements thus obtained is called a capacitive profile and is used to determine the position of the finger 8.

As the finger 8 moves across the writing surface 3, its coupling to each winding 51, 52 varies smoothly. The X and Y windings 51, 52 are arranged over the measurement area of the X-Y digitizer 9 so that wherever the finger 8 is on the writing surface 3, other than at the outer edges, it couples measurably to at least three successive windings on each axis. This is achieved by interleaving the traces of successive windings along each axis. The optimal amount of interleaving depends on the distance of the finger 8 from the windings 51, 52 and hence on the thickness of the writing surface 3; with less interleaving being required for a thicker writing surface 3. As a result, enough information is provided for the control and signal processing circuit 15 (or some other sub-system downstream thereof) to estimate the X-Y position of the finger 8.

As those skilled in the art will appreciate, it is possible to interleave the conductors used for the capacitive sensing because they are formed by a set of connected traces that are distributed along the appropriate measurement axis (the X axis for the Y windings 52 and the Y axis for the X windings 51). In this embodiment, each of the X and Y windings 51, 52 are also arranged so that the density of conducting material along the measurement axis of each winding varies across its width, being highest in the middle and lowest at the edges.

Capacitive position sensors that use an array of sensing electrodes arrayed in each measurement direction require that the capacitive profile width be greater than a certain minimum multiple of the electrode repeat distance to enable accurate interpolation. Traditional capacitive sensors achieve this minimum width by relying on the fact that human fingers are a certain minimum size, and their electrodes are smaller than this minimum size. The width of the profile is therefore dominated by the smallest finger likely to be encountered, and this in turn defines a certain maximum electrode repeat distance, and hence a minimum number of electrodes. In the present exemplary embodiments, the width of the profile is largely determined by the way in which the conductors comprising each electrode are patterned along the measuring direction. Since a relatively large number of conductors are used, and they are spread over a relatively large distance compared to the electrode to electrode repeat distance, it is possible to greatly reduce the number of electrodes required to span the desired measuring length. This reduces cost. As those skilled in the art will appreciate, this advantage of the present exemplary embodiments would remain even if the design were used in a purely capacitive position sensor.

Inductive Operation

To detect the position of an inductively coupled EM stylus, the controlling electronics powers the stylus 7 (in this embodiment) by passing an appropriate AC current through the excitation winding 55 that extends around the outside of the X and Y windings 51, 52. In this embodiment the excitation winding 55 is formed from winding traces on three layers of the PCB, occupying space at the edges of the upper two layers and the bottom layer of the PCB 11. Typically, the stylus 7 will have a resonant circuit whose resonant frequency approximately matches the frequency of the current applied to the excitation winding 55.

As mentioned above, the same windings that are used for capacitive operation also function as loop coils for inductive sensing. As shown in FIG. 2, in this embodiment, the windings at the edge of the sensor (X1, X9, Y1, Y7) have two loops while the others have three. FIG. 2 also illustrates the notional winding direction of two of the windings.

The stylus 7 is detected by measuring the EMF generated in each winding 51, 52 (e.g., from Y1A to Y1B, from X2A to X2B, etc.). This generated EMF will typically be approximately sinusoidal and of approximately the same frequency as the excitation waveform; it may be summarized, as familiar to those skilled in the art, by a magnitude and a phase or by a real and an imaginary part. A set of such measurements of EMFs obtained from all the X and Y coils is called an inductive profile and is used to determine the position of the stylus 7. The inductive profile may record only magnitudes, or the full magnitude and phase (or, equivalently, real and imaginary parts) of each winding's EMF, or some other representation of the size and possibly the sign of each EMF (for instance, by determining the phase at which the signal is expected to be seen and "resolving" the complex signal at that phase), as is familiar to those skilled in the art of inductive sensing. The position and configuration of the X and Y coils is selected to yield an inductive profile that varies smoothly with stylus position and that is amenable to use for accurate position computation.

Stylus status information such as contact with the writing surface 3, tip pressure, eraser presence and side switch activation may be conveyed to the control and signal processing circuit 15 by means such as varying the phase or frequency of the returned signal, or modulating its amplitude etc.

Combination of Capacitive and Inductive Measurement

As discussed above, the digitizer 9 is designed to provide both capacitive and inductive measurements using the same windings 51, 52. There are several ways in which the two types of measurements can be obtained, including:

- Each mode may be selected explicitly, perhaps by a physical switch or under the control of the host system.
- The two modes of sensing may be interleaved in time (perhaps alternating between the two, or some more complicated but substantially fixed scheme), providing in effect two parallel streams of information.
- One mode of sensing may be inhibited, or run at a substantially slower rate, when the subject of the other is observed to be present. Thus, when inductive sensing shows the presence of the stylus 7, capacitive sensing may be suppressed until the stylus 7 goes away, or run somewhat slower to allow low-bandwidth finger detection, or run much slower for the purpose of maintaining an accurate capacitive "baseline".
- The two modes may be operated simultaneously by driving the windings using common mode EMFs and for capacitive sensing detecting common-mode currents/charge and for inductive sensing detecting differential EMFs. Thus, a single measurement cycle may produce valid inductive and capacitive data together. As those skilled in the art will appreciate, this will typically require more complicated sensor circuits 19 than those required for sensing in one mode at a time. For example, in such an embodiment, two sensing circuits 19 may be provided for each winding.

The system may be configurable to operate in a capacitive only or an inductive only mode. Activation of the other mode can then be a feature paid for by the user; it might, for instance, be activated by sending a suitable command to the microcontroller, along with suitably encoded data to allow the firmware to determine that the feature has been validly paid for and authorized by the appropriate party.

In the present embodiment, inductive sensing and capacitive sensing are performed at different times. Additionally, during capacitive sensing the processing electronics generate and apply a capacitive guard signal, synchronized with the capacitive sensing waveform, to the excitation winding 55 to minimize interference that this winding 55 may cause with capacitive sensing, and to improve immunity to moisture on the front surface of the sensor. If inductive and capacitive sensing are performed simultaneously, then the excitation winding should preferably be driven with the superposition of this guard signal (common-mode) and the excitation signal (differential-mode).

Depending on the details of the sensing circuits, it may be appropriate to connect the ground plane not to ground but to this capacitive guard signal, so as to reduce the amount of "background" capacitance seen by the capacitive measuring process.

Digitizer Electronics

Figure 4:
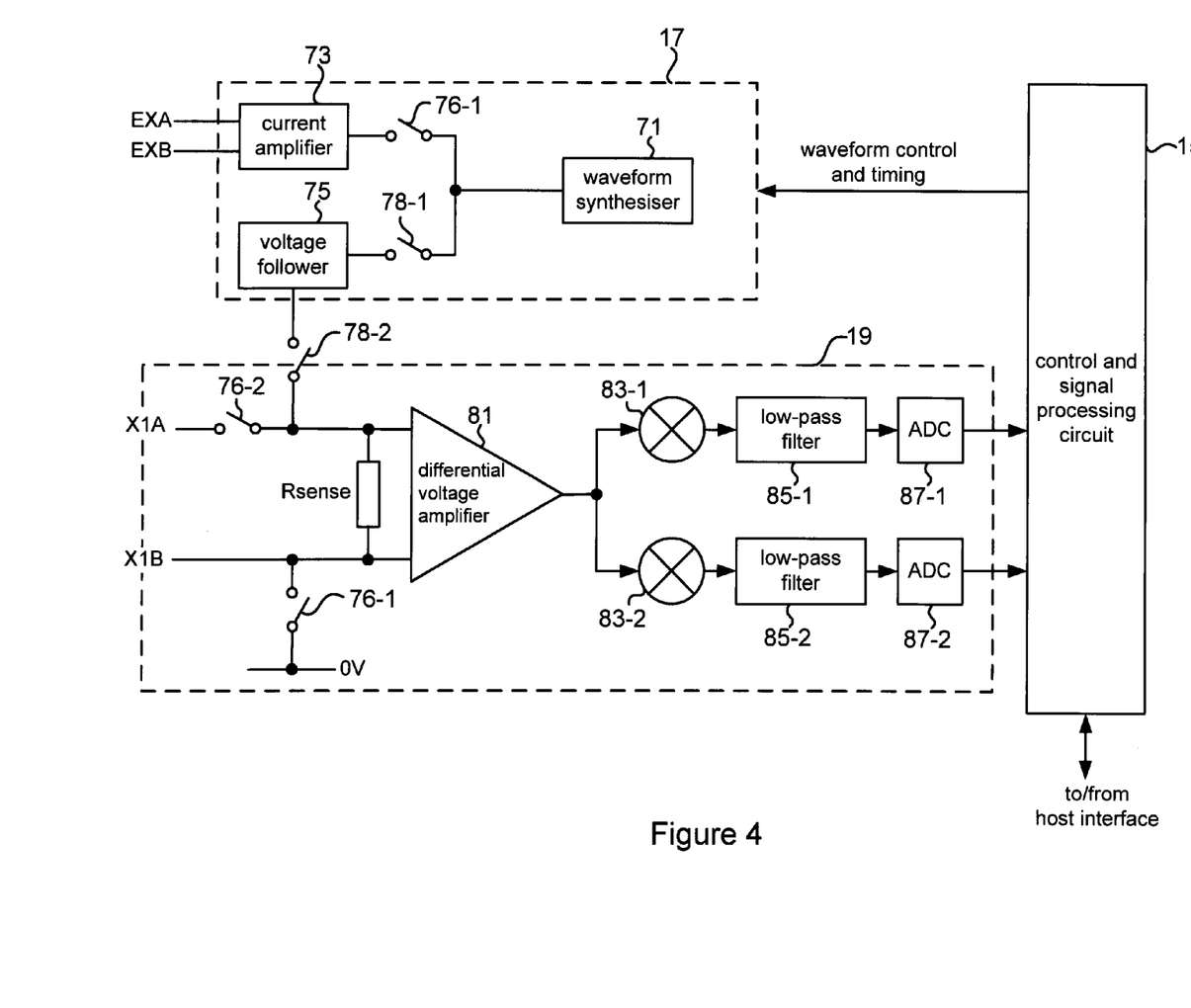
FIG. 4 is a schematic functional block diagram illustrating excitation and processing circuitry of the exemplary digitizer of FIG. 1.

FIG. 4 illustrates the main portions of the digitizer electronics 13 that are used in this exemplary embodiment. FIG. 4 actually shows the excitation circuit 17, the sensing circuit 19 of one channel that processes the signals obtained from one of the X or Y windings 51, 52 and the control and signal processing circuit 15. In this exemplary embodiment, a separate channel (sensing circuit 19) is provided for each X and Y winding 51, 52. In an alternative exemplary embodiment, the signals from two or more windings 51, 52 may be multiplexed into one channel.

Referring to FIG. 4, the waveform synthesizer 71, under the control of the control and signal processing circuit 15, is operable to generate a sinusoidal driving signal together with two mixer control signals MixControlI and MixControlQ (in phase and 90 degrees out of phase with the driving signal). As shown, the driving signal is passed through a current amplifier 73 and used to drive the excitation winding 55 of the digitizer for inductive sensing. In this mode of operation, the driving signal is not connected to the X and Y windings 51, 52 other than via electromagnetic induction. For capacitive sensing, the drive signal is instead connected through a voltage follower 75 to one end of each X and Y winding 51, 52, so that each winding's electrical potential oscillates with the drive signal. Switches 76 and 78 are provided and controlled by the control and signal processing circuit 15, for switching between inductive and capacitive operating modes. In particular, switches 76-1, 76-2 and 76-3 are all closed and switches 78-1 and 78-2 are all open for inductive sensing and switches 76-1, 76-2 and 76-3 are all open and switches 78-1 and 78-2 are all closed for capacitive sensing.

As discussed above, for inductive sensing the EMF induced in each X and Y winding 51, 52 is measured. This is achieved by connecting the ends of each winding 51, 52 to the inputs of a differential voltage amplifier 81. For capacitive sensing, it is the current flowing into or out of each X and Y winding 51, 52 that is measured. The sensing circuit 19 shown in FIG. 4 achieves this by passing that current through the resistor Rsense and measuring the potential difference across that resistor using the differential amplifier 81.

In either case, the output from the voltage amplifier 81 is mixed with (i.e., multiplied "pointwise" by) the two mix control signals mentioned above in the mixers 83-1 and 83-2. These mix control signals might be single-bit signals considered to alternate between +1 and −1, or multi-level digital signals, or even analogue signals approximating to appropriate sinusoids; the consequences in cost, size, power consumption and sensitivity to interference at harmonics of the operating frequency will be familiar to those ordinarily skilled in the art. The desired components of the signals at the mixer outputs are typically the low frequency components. The signals from the mixers 83 are accordingly low-pass filtered by the filters 85-1 and 85-2 to remove the unwanted high frequency components. The filtered signals are then converted in to the digital domain by the analogue to digital converters (ADC) 87-1 and 87-2, for further processing by the control and signal processing circuit 15.

Advantages

The exemplary embodiments may confer several advantages. It will be convenient to consider such possibilities under several headings, since some embodiments might realize some, but not all, of these advantages. The list here is not exhaustive, but describes some advantages of the exemplary embodiments described above.

As discussed above, the exemplary x-y digitizer 9 is implemented on a single sensor board 11 and the board is designed to reduce the interference that can result. The advantages of implementation on a single PCB include:

- The sensor can be manufactured more cheaply than if it required multiple PCBs.
- The sensor can be thinner than if it required multiple PCBs.
- Interfacing to the sensor requires fewer connections than multiple PCBs would; this in turn may simplify the routing of traces on the host system's circuit boards.
- Misalignment between the capacitive and inductive sensors is not an issue.

In this exemplary embodiment, the same controller IC is used to process the inductive and capacitive measurements. As those skilled in the art will appreciate, this offers a number of advantages, including:

- The system can be cheaper.
- Functions such as host interfacing and timing control, as well as much of the analogue circuitry, can be shared between the inductive and capacitive modes of operation, rather than being duplicated on two ICs. This may make for lower firmware development cost and time, better reliability, lower power consumption, and smaller semiconductor die area.
- Interfacing to the host system can be simpler: one protocol rather than two, one device rather than two, fewer connections. This in turn may reduce costs, complexity, development time, unreliability and size in the host system.
- The two sensing modes are under unified control, so that it is possible to keep each from interfering with the other and to save power by only running one when the other is inactive.

In this exemplary embodiment, the successive X and Y windings were interleaved with each other.

The advantages of interleaving adjacent channels' windings include:

- Fewer channels are required than if no interleaving were done, reducing complexity and cost.
- It becomes easier to compute position estimates that are roughly linear relative to actual position of the stylus or finger.

In the above exemplary embodiment, a divided ground plane was provided under the X and Y sensing windings. This has the following advantages:

- The capacitive sensor is shielded from any interference sources that might be located below it, much as it would be for a solid ground plane.
- However, eddy-current effects (which attenuate the magnetic field, increase power consumption and complicate the operation of the inductive sensor) are greatly reduced.

Modifications

A detailed exemplary embodiment has been described above. A number of modifications may be made to this embodiment, and a few of these modifications will now be described.

Instead of exciting the stylus 7 via an excitation winding 55, the stylus 7 may be electrically connected to the sensing system and driven directly, or it may contain an energy store such as a battery and, therefore, not need to be powered externally. The stylus 7 may contain circuitry somewhat more complicated than a simple resonant circuit (for instance, digital electronics to send a stream of information to the sensor by modulating the stylus signal's frequency, phase or amplitude), which may be powered in any of the ways already described. Further, where the digitizer does excite the stylus, it may do so by energizing the windings 51, 52 and sensing the EMFs generated in the outer winding 55. In such an embodiment, each winding 51, 52 may be excited in turn and the corresponding EMF generated in winding 55 measured or they may be excited together using different excitation frequencies for each winding and performing a frequency analysis of the signal generated in the winding 55. Alternatively still, the stylus may be energized by exciting one or more of the windings 51, 52 and its position determined by processing the signals obtained from other ones of the windings 51,52. In such an embodiment, the outer excitation winding 55 would not be needed.

For the capacitive operation, instead of driving the X and Y windings 51, 52 with a known voltage, they may be driven with a known current or a known amount of charge, and the voltage reached measured. This mode of operation, again, may be performed with a variety of different signal waveforms. More generally, what is required is that the voltage changes, and either the charge transferred or the current and the time involved, should be known, either because the controlling electronics ensure a particular value or because the value is measured. Additionally, a "transcapacitance-sensing mode" may be used, in which each x-electrode is excited with an EMF in turn with the others zero, and the charge/current injected into the y-electrodes measured. By scanning through the x-electrodes, a complete map of electrode-to-electrode "transcapacitances" can be built up. Individual transcapacitance figures are a function of finger presence near their intersection, in a similar way that absolute capacitance measurements are a function of finger presence somewhere along the respective electrode. The difference is that finger presence generally decreases the value of the coupling capacitance, and the magnitude of the change is smaller. One advantage of the transcapacitance approach is that it allows the system to sense multiple fingers, since a complete 2D map is generated, not just two 1D maps representing x- and y-profiles.

In the above embodiment a 4-layer PCB was used. Fewer layers could be used if a ground plane is not required and/or if the controlling electronics are placed separately (e.g. at the far end of a "tail", perhaps).

In the above embodiment, a single turn of excitation winding 55 was provided on the upper two layers and on the bottom layer of the PCB 11. More turns or even fewer turns of excitation winding 55 could be provided if desired.

The sensor PCB could be made from materials other than FR4 and copper. For instance, it could be made from transparent plastic and ITO, thus producing a fully transparent board suitable for mounting above a display. In a typical embodiment of this sort, the fourth layer would be absent and the digitizer electronics would be connected via a "tail" at one edge of the sensor board. In such an embodiment, it might be possible to do without the third layer (ground plane 60) as well. The digitizer windings may be manufactured from any appropriate technology such as with discrete wires, conductors punched from sheet material, printed inks, etc. The conductors may also be formed from very fine wires embedded into a transparent substrate placed over the display, which allow capacitive and inductive measurements while not interfering with the visibility of the display.

The embodiment described above uses nine windings on one axis and seven on the other. Either or both of these numbers may be varied. Further, the windings of one axis may be omitted if a 1-dimensional measurement suffices.

The embodiment described above uses nine substantially parallel traces per winding 51, 52 for most of the windings, and a smaller number for the windings at the edges of the sensor board. Either more or fewer traces can be used, trading off extent of overlap, number of turns of loop coil, track/gap geometry, and the like. Additionally, the amount of overlap of the windings 51, 52 can be varied; in an extreme case, there may be no overlap at all. The design of the windings 51, 52 at the edges of the sensor (in the above embodiment windings 51-X1, 51-X9, 52-Y1 and 52-Y7) may be varied largely independently of the others, so as to optimize position measurement at the edge of the sensing area.

The conducting loops forming part of the windings 51, 52 need not be rectangular in shape; they may be distorted in ways that optimize the inductive profiles measured by the system. Accordingly, conducting traces shown in the Figures here as straight lines running the entire length or width of the sensor board 11 may in fact be bent in various ways. Whether rectangular or not, the windings need not be (as they are here) of equal width, composed of traces of equal width, and arrayed at equal separations; all these parameters may be varied to optimize position measurement accuracy. In particular, as the width of the traces will have no appreciable affect on the inductive operation of the sensor, the widths of the traces can be varied to "tune" the capacitive operation of each winding.

Depending on the electromagnetic environment in which the sensor must function (typically determined by the host system's design) it may be advantageous to place a layer of magnetic screening material, such as mumetal or spin-melt ribbon, below the sensor. It might, for instance, be affixed to the bottom layer (shown in FIG. 3*d*) and have cut-outs for the controlling IC and for any cable attachments.

The electronics illustrated in FIG. 4 constitute only one of a great variety of ways to perform the above described measurements. A representative, but incomplete, sampling of possible variations follows: The amount of per-channel duplication could be reduced by means of sample-and-hold circuitry. The inductive and capacitive measurements could be performed by separate circuitry, connected to the sensor via a multiplexer. Capacitive measurement could be performed by injecting a known amount of charge and measuring voltage, rather than the reverse as described above. Instead of using a voltage amplifier and placing a resistor in parallel with it to measure currents, we could use a current amplifier and place a resistor in series with one input to measure voltages. In one important version of this technique, the key component is a current amplifier that is able to control the voltage at its input and that amplifies the current that flows in order to maintain this voltage: for capacitive sensing, the voltage control signal would come from the waveform generator. The driving signal need not be even approximately sinusoidal; for instance, it may be advantageous for some sorts of capacitive sensing to drive with a "step-function" signal and measure at one or more instants after transient currents have stopped flowing. Waveform generation may be accomplished in a variety of ways, such as a high-resolution direct digital synthesis circuit, a simple pulse generator followed by a low-pass filter, or some compromise between the two. There may be filters before as well as after the mixers, to prevent aliasing down of high-frequency interference. The post-mix filters may be omitted. Rather than mixing to get "I" and "Q" components of an oscillating signal, it may suffice simply to measure its amplitude, or to use only a single mixer whose phase may be either fixed or set by the control and signal processing circuit 15. Some other means of measuring phase may be used. Some functions drawn as separate blocks may in fact, be performed by a microcontroller. Similarly, some of the functions assigned to the digitizer electronics may be performed by a more capable CPU in the host system.

In one exemplary embodiment, the digitizer electronics 9 may be configured to perform a self-test, perhaps every time the sensor is powered up. It would check that each winding's A and B ends are electrically connected, and that no two windings are connected to one another. Quantitative measurements of capacitance (and, with suitable controlling electronics, mutual inductance) would also be possible.

The application also comprises the following directed to various combinations of features.

A1. A transducer for use in a position sensor, the transducer comprising:
  a plurality of windings formed by conductors on one or more layers of a sensor board, for inductive or capacitive coupling with another object positioned on one side of the windings; and
  a conductor plane for reducing noise caused by objects positioned on an opposite side of the windings;
  wherein said conductor plane is formed from a plurality of interconnected conductive islands.

A2. A transducer according to clause A1, wherein said conductor plane is formed integrally with or separate from the sensor board.

A3. A transducer according to clause A1 or A2, wherein said conductor plane is formed from a two dimensional array of interconnected conductive islands.

A4. A transducer according to any of clauses A1 to A3, wherein said conductor plane is connected, in use, to ground.

A5. A transducer according to any of clauses A1 to A4, wherein said conductive islands have the same shape or different shapes.

B1. A transducer for use in a position sensor, the transducer comprising a plurality of conductive windings arrayed along a measurement path and each comprising one or more loop portions having ends for connection to detection circuitry for use in inductive sensing and one or more single ended conductive portions, each connected at one end to a loop portion and unconnected at the other end, for use in capacitive sensing.

B2. A transducer according to clause B1, wherein said loop portions are for both inductive and capacitive sensing.

B3. A transducer according to clause B1 or B2, further comprising detection circuitry coupled to said windings and having a first mode of operation in which signals inductively coupled to or from said windings are detected and a second mode of operation in which signals capacitively coupled to or from said windings are detected.

C1. A capacitive position sensor comprising:
  a plurality of conductive windings arrayed along a measurement path for capacitive coupling with another object; and
  a detector electrically coupled to said windings and operable to detect signals that vary with the capacitive coupling between said windings and said object;
  wherein each winding comprises a set of conductor traces distributed along the measurement path; and
  wherein the trace width and/or the separation between adjacent traces of the same winding varies along the measurement path.

C2. A capacitive position sensor according to clause C1, wherein said conductor traces extend substantially perpendicular to said measurement path.

C3. A capacitive position sensor according to clause C1 or C2, wherein each of said windings is arranged so that its conductor traces are interleaved with the conductive traces of one or more adjacent windings.

C4. A capacitive position sensor according to clause C1 or C2, wherein the density of conducting material of each winding varies along the measurement path.

D1. A capacitive position sensor comprising:
- a plurality of conductive windings arrayed along a measurement path for capacitive coupling with another object; and
- a detector electrically coupled to said windings and operable to detect signals that vary with the capacitive coupling between said windings and said object;
- wherein each winding comprises a set of electrically connected conductor traces distributed along the measurement path; and
- wherein each of said windings is arranged so that its conductor traces are interleaved between the conductor traces of one or more adjacent windings.

D2. A transducer according to clause D1, wherein said conductor traces extend substantially perpendicular to said measurement path.

E1. A transducer for use in a position sensor, the transducer comprising:
- a plurality of windings formed by conductors on one or more layers of a sensor board, for inductive or capacitive coupling with another object positioned on one side of the windings;
- a conductor plane for reducing noise caused by objects positioned on an opposite side of the windings; and
- a divided strike ring formed from a plurality of discrete conductor traces on an upper layer of the sensor board, which conductor traces extend around an outer periphery of the windings and are each electrically connected to said conductor plane.

F1. A computer device having a dual inductive and capacitive user interface, wherein the capacitive or the inductive operation of the interface can be inhibited and selectively provided in response to receipt of a command from a host of the computer device.

F2. A computer device comprising:
- a dual inductive and capacitive user interface;
- means for inhibiting the inductive or capacitive operation of the user interface;
- means for receiving a command to allow dual operation of said user interface; and
- means for deactivating said inhibiting means in response to receiving said command, to allow the user to interface with the computer device in both a capacitive and inductive manner.

What is claimed is:

1. A transducer for use in a position sensor, the transducer comprising a single laminate sensor board carrying:
- a plurality of windings formed by conductors on one or more layers of the sensor board, the windings being arrayed over a first area of the sensor board; and
- detection circuitry mounted on another layer of the sensor board over a second area of the circuit board and electrically coupled to said windings, said detection circuitry having a first mode of operation in which signals inductively transmitted from or received by said windings are detected and a second mode of operation in which signals capacitively transmitted from or received by said windings are detected,
- wherein said windings and said detection circuitry are arranged on said sensor board so that said first and second areas oppose each other;
- wherein said sensor board comprises a conductor plane positioned in a layer different from the one or more layers in which said windings are arrayed and between the plurality of windings and said detection circuitry to reduce noise when said detection circuitry is operating in said second mode of operation; and
- wherein said conductor plane is formed from a plurality of interconnected conductive islands to reduce eddy current noise when said detection circuitry is operating in said first mode of operation.

2. A transducer according to claim 1, wherein said conductor plane is formed from a two dimensional array of interconnected conductive islands.

3. A transducer according to claim 1, wherein said conductor plane is connected to a ground connection of said detection circuitry.

4. A transducer according to claim 1, wherein at least one of said windings comprises conductor traces which form one or more conductive loops for inductive sensing and one or more single ended traces for capacitive sensing.

5. A transducer according to claim 4, wherein each winding comprises conductor traces which form one or more conductive loops for inductive sensing and one or more single ended traces for capacitive sensing.

6. A transducer according to claim 4, wherein said single ended traces are electrically connected at one end to a conductor trace which forms part of said conductive loops and is open circuit at the other end.

7. A transducer according to claim 1, wherein each winding is for sensing position along a measurement path and has a plurality of conductor traces that are distributed along the measurement path.

8. A transducer according to claim 7, wherein the conductor traces of adjacent windings are interleaved with each other along the measurement path.

9. A transducer according to claim 7, wherein the trace width of adjacent traces of the same winding and/or the separation between adjacent traces of the same winding varies along the measurement path.

10. A transducer according to claim 7, wherein the density of conducting material of each winding varies along the measurement path.

11. A transducer according to claim 7, wherein said distributed traces extend substantially perpendicular to said measurement path.

12. A transducer according to claim 7, comprising two groups of windings, the windings in the first group for sensing position along a first measurement path and the windings in the second group for sensing position along a second different measurement path.

13. A transducer according to claim 1, comprising a divided strike ring formed from a plurality of conductor traces on an upper layer of the sensor board which extend around the periphery of the first area and which are electrically connected to said conductor plane.

14. A transducer according to claim 13, wherein said divided strike ring also comprises a plurality of conductor traces on a bottom layer of the sensor board which extend around the periphery of the first area and which are connected to said conductor plane.

15. A transducer according to claim 1, wherein said detection circuitry is carried by a bottom layer of said sensor board.

16. A transducer according to claim 1, wherein said windings are formed from conductor traces on a first, upper, layer of the sensor board and a second, lower, layer of the sensor board and wherein the traces on the second layer have a greater width than the traces on the first layer.

17. A transducer according to claim 1, wherein in said first mode of operation, said detection circuitry is operable to detect and process signals supplied to or received from said windings as a result of inductive coupling of the windings with an electromagnetic user device, to determine the position of the user device relative to the windings.

18. A transducer according to claim 1, wherein in said second mode of operation, said detection circuitry is operable to detect and process signals supplied to or received from said windings as a result of capacitive coupling of the windings with a user's finger or the like, to determine the position of the user's finger relative to the windings.

19. A transducer according to claim 1, wherein said detection circuitry uses the same processing electronics to process the signals in said first and second modes of operation.

20. A transducer according to claim 1, wherein said detection circuitry is operable, in said first mode of operation, to detect an EMF generated in each winding and is operable, in said second mode of operation, to detect an amount of current or charge supplied to each winding.

21. A transducer for use in a position sensor, the transducer comprising a single laminate sensor board carrying:
   a plurality of windings formed by conductors on one or more layers of the sensor board; and
   detection circuitry mounted on another layer of the sensor board and positioned under, and electrically coupled to, said windings, said detection circuitry having a first mode of operation in which signals inductively coupled with said windings are detected and a second mode of operation in which signals capacitively coupled with said windings are detected;
   wherein said sensor board comprises a conductor plane positioned in a layer different from the one or more layers in which said windings are arrayed and between the plurality of windings and said detection circuitry to reduce noise when said detection circuitry is operating in said second mode of operation; and
   wherein said conductor plane is formed from a plurality of interconnected conductive islands to reduce eddy current noise when said detection circuitry is operating in said first mode of operation.

22. A position sensor comprising a transducer according to claim 1 and processing circuitry for processing the detected signals and for determining the position of an object relative to the windings of said transducer.

23. A position sensor according to claim 22, wherein said processing circuitry is carried by said sensor board.

* * * * *